US011535338B2

(12) United States Patent
Sala

(10) Patent No.: US 11,535,338 B2
(45) Date of Patent: Dec. 27, 2022

(54) ELECTRONIC REAR DERAILLEUR

(71) Applicant: TIEN HSIN INDUSTRIES CO., LTD., Taichung (TW)

(72) Inventor: Alfredo Sala, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 382 days.

(21) Appl. No.: 16/902,335

(22) Filed: Jun. 16, 2020

(65) Prior Publication Data

US 2021/0387696 A1 Dec. 16, 2021

(51) Int. Cl.
*B62M 9/122* (2010.01)
*G01D 5/14* (2006.01)

(52) U.S. Cl.
CPC ............. *B62M 9/122* (2013.01); *G01D 5/145* (2013.01)

(58) Field of Classification Search
CPC .................. B62M 9/122; B62M 9/132; B62M 2009/12406; B62M 9/124
USPC .......................................................... 474/80
See application file for complete search history.

(56) References Cited

U.S. PATENT DOCUMENTS

| 4,469,479 | A | * | 9/1984 | Ozaki | ............... | B62M 9/1242 474/80 |
| 4,601,682 | A | * | 7/1986 | Nagano | ............... | B62M 9/127 474/78 |
| 5,890,979 | A | * | 4/1999 | Wendler | ............... | B62L 3/023 474/82 |
| 7,549,662 | B2 | * | 6/2009 | Righi | ............... | B62M 9/124 474/82 |
| 9,334,017 | B2 | * | 5/2016 | Sala | ............... | B62M 9/122 |
| 9,656,723 | B1 | * | 5/2017 | Tachibana | ............... | B62M 9/122 |
| 11,230,349 | B2 | * | 1/2022 | Liao | ............... | B62M 9/125 |
| 2007/0216130 | A1 | * | 9/2007 | Righi | ............... | B62M 9/122 280/210 |
| 2014/0087901 | A1 | * | 3/2014 | Shipman | ............... | B62M 9/122 429/100 |
| 2015/0259031 | A1 | * | 9/2015 | Sala | ............... | B62M 9/122 474/80 |
| 2017/0066501 | A1 | * | 3/2017 | Hilgenberg | ............... | B62M 25/08 |

* cited by examiner

*Primary Examiner* — Henry Y Liu
(74) *Attorney, Agent, or Firm* — WPAT, PC

(57) ABSTRACT

An electronic rear derailleur of the disclosure includes a movable portion including a main drive gear meshing with a first driven gear and a second driven gear, a support frame disposed on the movable portion and for the main drive gear, the first driven gear, and the second driven gear to perform positioning, a drive unit configured to drive, by using a transmission assembly, the main drive gear to rotate, and a positioning system including: a main board, a processing unit and a position sensor disposed on the main board, and a positioning shaft including a magnetic field generation unit facing the position sensor, and receiving, by using the processing unit, positioning information sent by the position sensor. The position sensor is configured to detect a change in an angular position to correct a parameter, thereby restoring a speed change function for normal speed change positioning.

10 Claims, 7 Drawing Sheets

ELECTRONIC REAR DERAILLEUR

BACKGROUND

Technical Field

The disclosure relates to an electric rear derailleur of a bicycle, and in particular, to an electronic rear derailleur with a positioning function.

Related Art

An ordinary electric rear chain guide, including: a fixing portion, a drive assembly, a transmission unit, a linkage unit, and a guiding member. The fixing portion has a first joint and a fixing end. The fixing end is connected to a rear frame of a bicycle. The first joint is connected to the linkage unit. A junction between the first joint and the linkage unit has a first recess. The drive assembly drives a drive gear to rotate. The transmission unit has a transmission shaft and a transmission block. The transmission shaft includes a driven gear and a threaded section. The drive gear drives an idler and then drives a driven gear. The transmission block includes a screw hole and a transmission portion with a plurality of fitting teeth. The transmission block is screwed to the threaded section with the screw hole of the transmission block and may move on the transmission shaft.

The linkage unit includes a movable portion, a rotating gear, and a gear set. The movable portion has a first end, a second end, a mandrel, an accommodating space, and a cover plate. The first end is pivotally connected to the first joint and rotates around the first joint. The gear set is disposed on the movable portion. The rotating gear meshes with the transmission portion and passes through the mandrel. A lantern ring is disposed on one side of the rotating gear. A protruded key is disposed on an outer periphery of the lantern ring.

The guiding member has a second joint and is pivotally connected to the second end of the movable portion to rotate around the movable portion. A junction between the second joint and the second end has a second recess. The guiding member includes a chain guide arm. The chain guide arm includes a pulley for a chain to be hung. There is an interval between the movable portion and a chain guide portion for the chain to pass through. The gear set includes a main drive gear disposed in an accommodating space, a first gear, and a second gear. The main drive gear is located between the first gear and the second gear and meshes with the first gear and the second gear, to cause the main drive gear to simultaneously drive the first gear and the second gear. The main drive gear includes a main drive gear flange in a direction facing the cover plate. The main drive gear flange passes through a center of a main transmission bearing. The main drive gear includes a central hole. A hole wall of the central hole includes a groove. The protruded key outside the rotating gear is engaged with the groove.

However, after the electric rear chain guide is used for a period of time, if the main drive gear, the first gear, and the second gear are loose due to wear, resulting in inaccuracy of transmission among the movable portion, the fixing portion and the guiding member, and further causing a failure of speed change.

SUMMARY

The disclosure is mainly intended to dispose a main board with a position sensor on it inside a derailleur, and a positioning shaft configured to rotate with a first driven gear, the positioning shaft including a magnetic field generation unit in a direction facing the position sensor, and when the main drive gear, the first driven gear, and the second driven gear are loose due to abrasion, the position sensor being configured to detect a change in an angular position to correct a parameter in a controller, so as to restore normal speed change positioning, achieving normal speed change through the derailleur.

To achieve the foregoing objective, the disclosure discloses an electronic rear derailleur including: a movable portion, a support frame, a drive unit, a fixing portion, a chain guide portion, and a positioning system. The movable portion includes a main drive gear meshing with a first driven gear and a second driven gear; the support frame is disposed on the movable portion and is for the main drive gear, the first driven gear, and the second driven gear to perform positioning, the support frame including a first support hole; the drive unit is configured to drive, by using a transmission assembly, the main drive gear to rotate; the fixing portion is fixed to a rear frame of a bicycle and has a first connecting portion connected to the first driven gear, to cause the first connecting portion to be moveably connected to a first end of the movable portion; the chain guide portion has a second connecting portion connected to the second driven gear, to cause the chain guide portion to be moveably connected to a second end of the movable portion, the chain guide portion including at least one pulley meshing with a chain of the bicycle; and the positioning system includes: a main board, a processing unit and a position sensor respectively disposed on the main board, and a positioning shaft disposed in the first support hole of the support frame and connected to the first driven gear, the positioning shaft including a magnetic field generation unit facing the position sensor, and receiving, by using the processing unit, positioning information sent by the position sensor.

The first driven gear includes a first recess in a direction facing the support frame, a center of the first driven gear including a first shaft hole, the positioning shaft including a convex portion assembled with the first recess, a convex pillar extending from the convex portion toward a direction of the first shaft hole, and the convex pillar being assembled with the first shaft hole of the first driven gear.

The positioning shaft includes an accommodating space, the magnetic field generation unit being disposed in the accommodating space.

The positioning shaft is mounted in a first support hole of the support frame through a first bearing.

The drive unit includes a control module to control a number of drive cycles and a rotational speed of the drive unit, the control module being electrically connected to the processing unit.

The main board further includes a memory unit electrically connected to the processing unit, the memory unit storing a comparison table, the comparison table including comparison information between the positioning information and a position of the electronic rear derailleur, the processing unit accessing the comparison table after obtaining the positioning information to obtain the position of the electronic rear derailleur, and correct the control module.

The position sensor is a Hall effect sensor, and a side of the magnetic field generation unit facing the position sensor has at least an N pole and an S pole.

The positioning shaft is a bolt, the convex pillar has an external thread, and the first shaft hole includes an internal thread for the convex pillar to be screwed and for the positioning shaft to rotate with the first driven gear.

The position sensor and the drive unit are disposed on two opposite sides of the main board, respectively.

The position sensor and the magnetic field generation unit are disposed with no contact.

Through the structure, after the rear derailleur is used for a considerable period of time, the main drive gear, the first driven gear, and the second driven gear are loose, resulting in inaccuracy of transmission, causing the positioning shaft rotating together with the first driven gear to be rotated abnormally, and further causing the magnetic field generation unit disposed in the accommodating space on the positioning shaft not to rotate at a precise angular position. In this case, a detected angular position signal of the magnetic field generation unit may be transmitted, by the detection of the position sensor on the main board, back to the control module for correction. The position sensor is configured to detect a change in the angular position to correct a parameter in the controller so as to restore normal speed change positioning, achieving normal speed change through derailleur.

DETAILED DESCRIPTION

Figure 1:
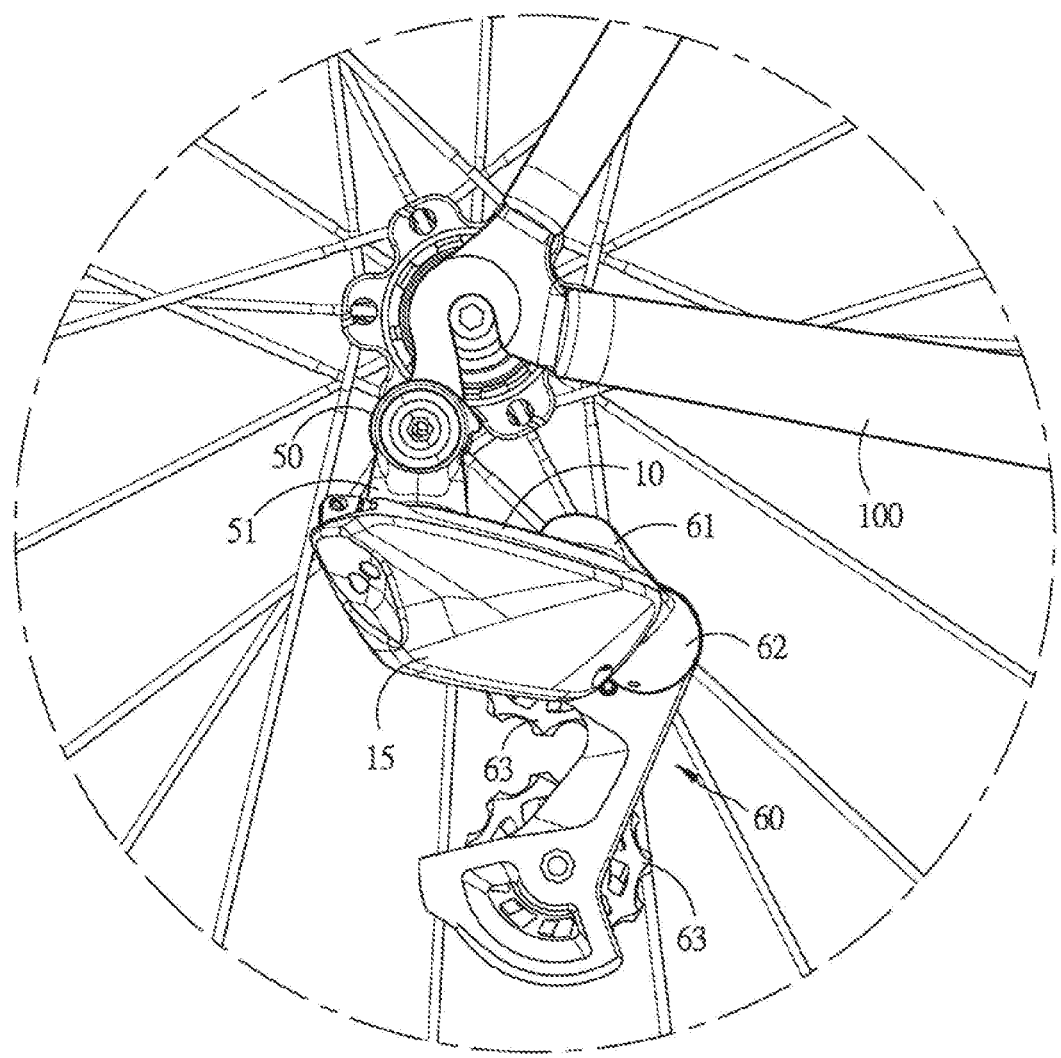
FIG. 1 is a schematic assembled diagram of an embodiment of the disclosure on a rear frame of a bicycle.
Figure 2:
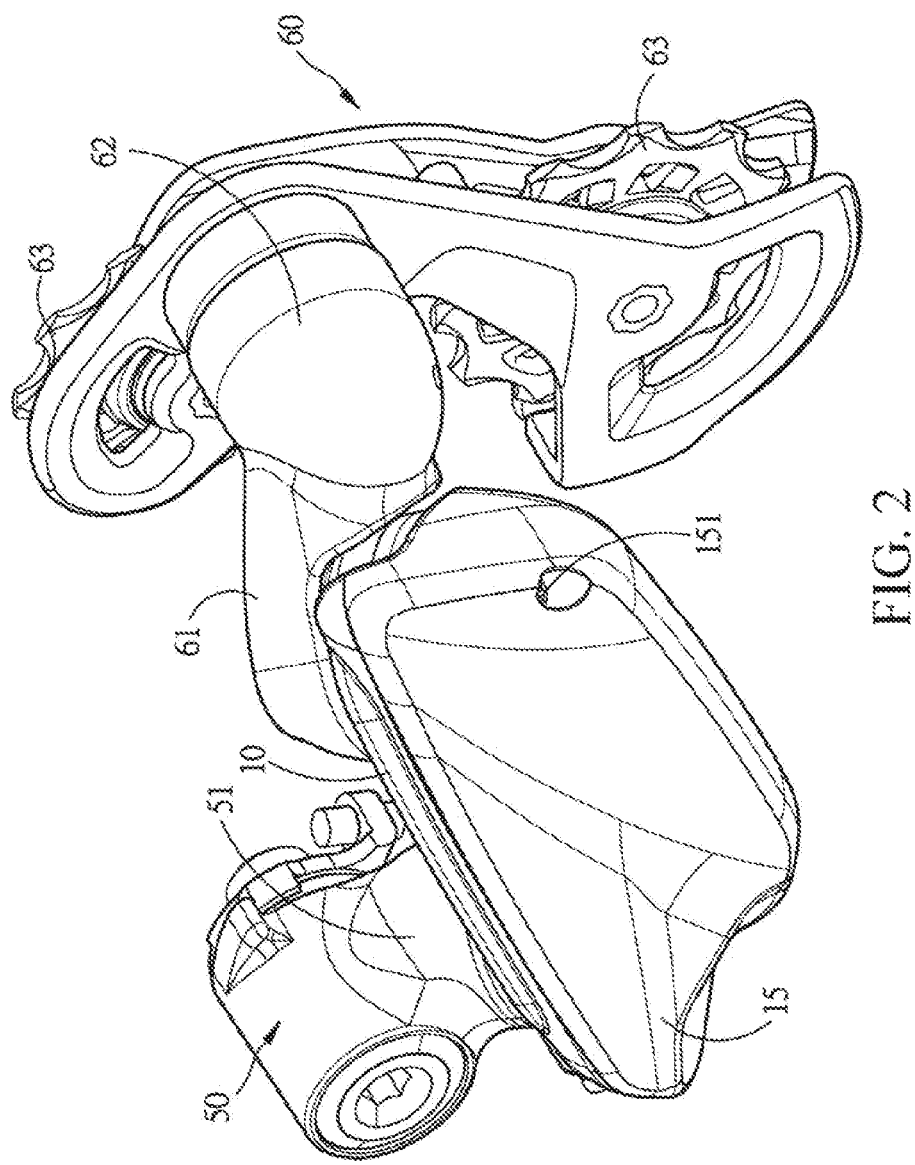
FIG. 2 is an assembled outside diagram of an embodiment of the disclosure.

The disclosure will be further described below with reference to the accompanying drawings and specific embodiments, so that those skilled in the art can better understand and implement the disclosure, but the listed embodiments are not intended to limit the disclosure.

Referring to FIG. 1 to FIG. 6, the disclosure discloses an electronic rear derailleur for moving a chain of a bicycle to engage with a target sprocket in a plurality of sprockets to achieve gear shift (not shown). The electronic rear derailleur includes: a movable portion 10, a support frame 14, a cover plate 15, a positioning system 16, a drive unit 20, a transmission assembly 30, a gear box 40, a fixing portion 50, and a chain guide portion 60.

The movable portion 10 is movably connected to the fixing portion 50 and the chain guide portion 60, respectively, and is a long casing having a first end 101 and a second end 102 in different directions. The movable portion 10 has a connecting surface 107 in a direction opposite to the fixing portion 50. The connecting surface 107 includes an elongated recessed room 103 inward. Both ends of the recessed room 103 have a first joint hole 104 and a second joint hole 105, respectively. A mandrel 106 is located between the first joint hole 104 and the second joint hole 105. The first joint hole 104 is configured to be assembled by a pivot of a first driven gear 11. The first driven gear 11 includes a non-circular first sleeve portion 111. In this embodiment, the first sleeve portion 111 is a square pillar. A center of the first driven gear 11 includes a first shaft hole 112 having an internal thread and includes a first recess 113 in a direction facing the cover plate 15. The second joint hole 105 is configured to be assembled by a pivot of a second driven gear 12. The second driven gear 12 includes a non-circular second sleeve portion 121. In this embodiment, the second sleeve portion 121 is a square pillar. A center of the second driven gear 12 includes a second shaft hole 122 and includes a second recess 123 in a direction facing the cover plate 15. The mandrel 106 is pivotally connected to a main drive gear 13. The main drive gear 13 meshes with the first driven gear 11 and the second driven gear 12. Therefore, the main drive gear 13 simultaneously drive the first driven gear 11 and the second driven gear 12 to rotate. The connecting surface 107 includes several screw holes 108. The movable portion 10 includes a circular first protrusion 109 and a second protrusion 110 in a direction opposite to the recessed room 103.

The support frame 14 is disposed on the movable portion 10. A shape of the support frame 14 is similar to a shape of the connecting surface 107 of the movable portion 10. The support frame 14 is disposed on the connecting surface 107. The first driven gear 11, the second driven gear 12, and the main drive gear 13 are disposed on the support frame 14. The support frame 14 includes a first support hole 141 and a second support hole 142 facing the first driven gear 11 and the second driven gear 12. A through hole 143 is disposed between the first support hole 141 and the second support hole 142. The mandrel 106 passes through the through hole 143 of the support frame 14.

The cover plate 15 faces the movable portion 10 to seal the drive unit 20, the gear box 40, and the support frame 14, and passes through the cover plate 15 and the support frame 14 through several connecting members 151 such as a screw, and is screwed with a screw hole 108 of the movable portion 10.

Figure 3:
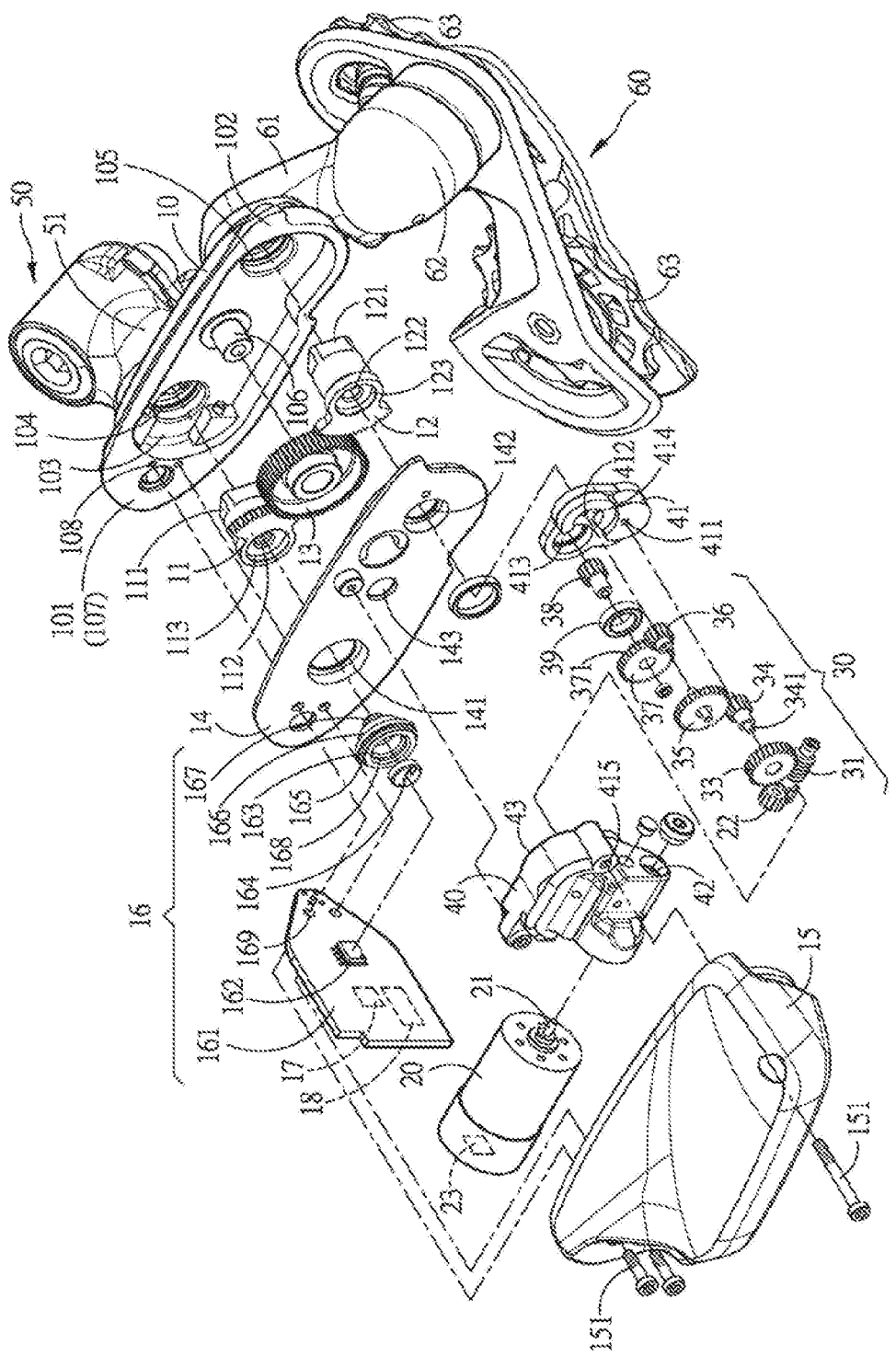
FIG. 3 is a first exploded diagram of an embodiment of the disclosure.
Figure 4:
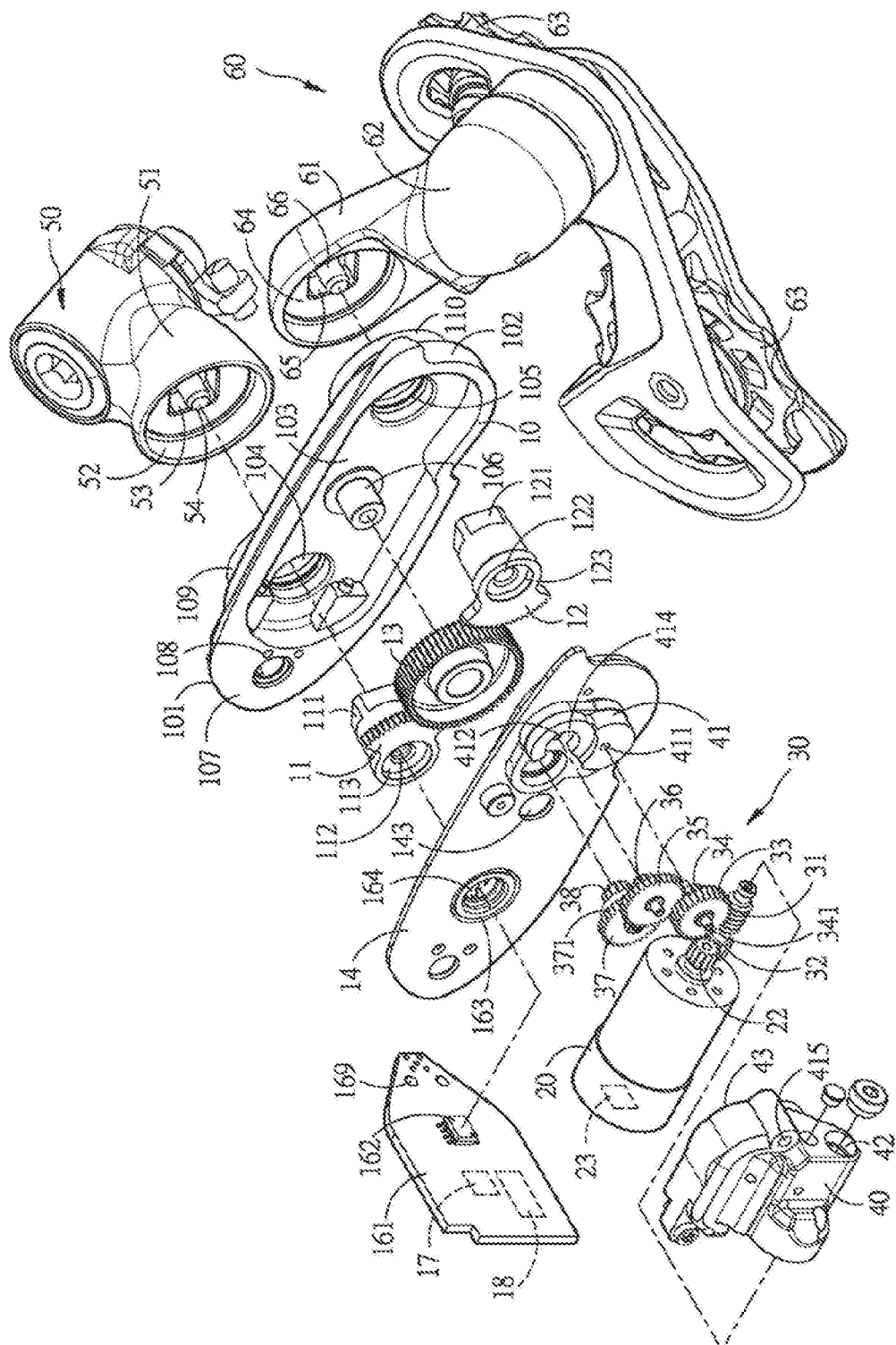
FIG. 4 is a second exploded diagram of an embodiment of the disclosure.
Figure 5:
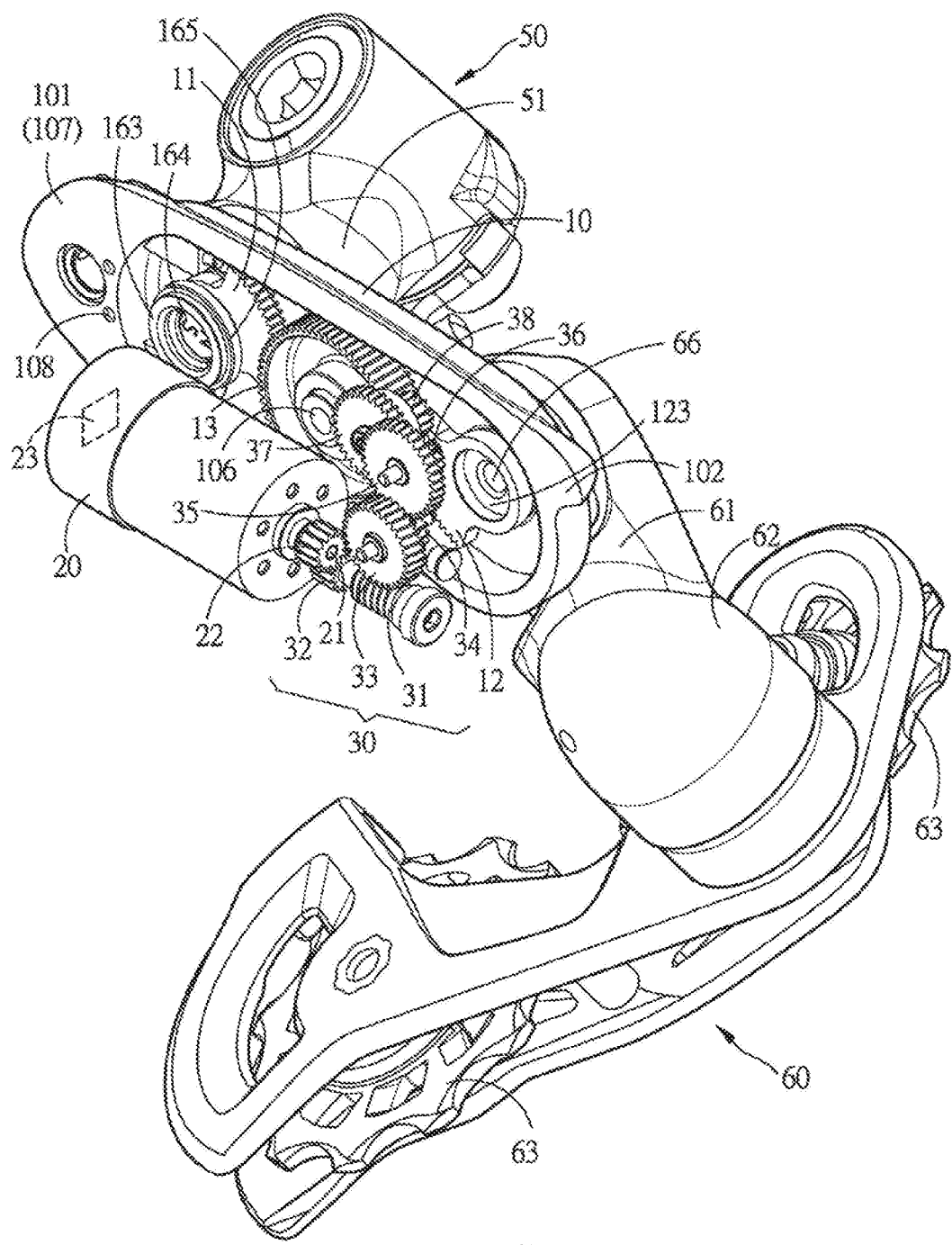
FIG. 5 is a schematic partial assembled diagram of an embodiment of the disclosure.
Figure 6:
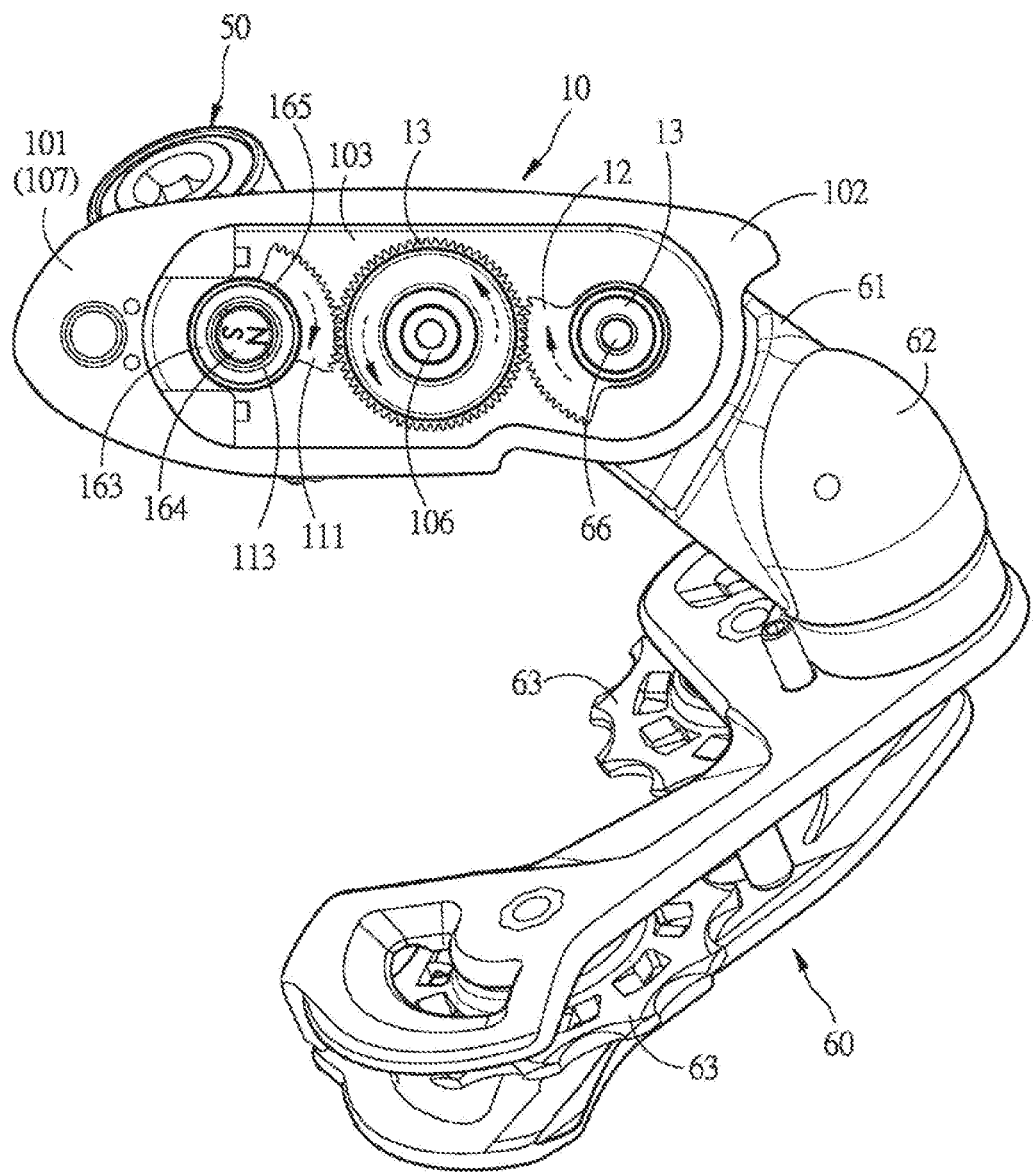
FIG. 6 is a partial assembled diagram of an embodiment of the disclosure.
Figure 7:
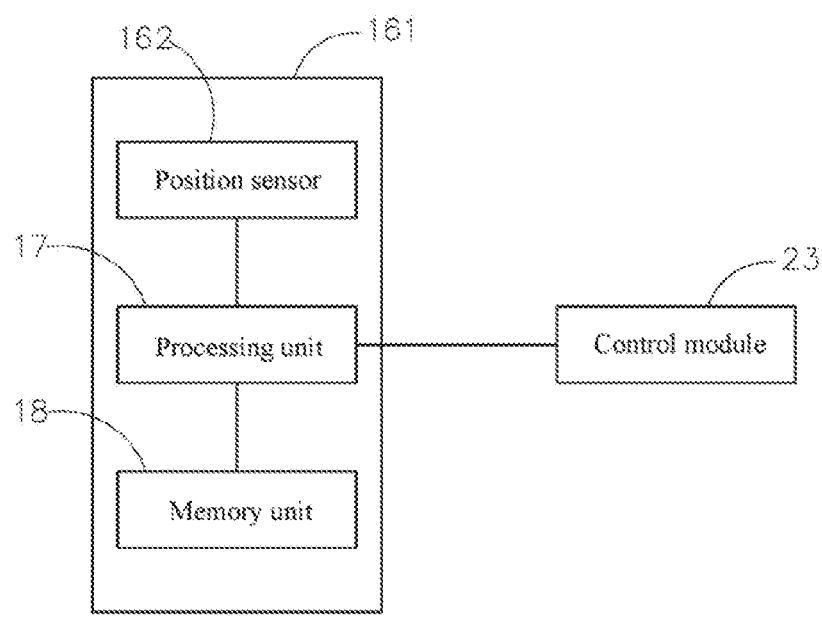
FIG. 7 is a block diagram of an embodiment of the disclosure.

Still referring to FIG. 3, FIG. 4, and FIG. 7, the positioning system 16 includes: a main board 161, a position sensor 162 disposed on the main board 161, a positioning shaft 163, and a magnetic field generation unit 164 disposed on the positioning shaft 163, a processing unit 17, and a memory unit 18 electrically connected to the processing unit 17. The position sensor 162 is a Hall effect sensor. The positioning shaft 163 is mounted in the first support hole 141 of the support frame 14 through a first bearing 165. The positioning shaft 163 includes a convex portion 166 in a direction facing the movable portion 10. A convex pillar 167 extends from an outside the convex portion 166. The convex pillar 167 has an external thread screwed with an internal thread of the first shaft hole 112. The convex portion 166 is engaged with the first recess 113 of the first driven gear 11, so that the positioning shaft 163 rotates with the first driven gear 11, thereby causing the magnetic field generation unit 164 and the positioning shaft 163 to rotate together. The positioning shaft 163 includes a circular accommodating space 168 in a direction facing the cover plate 15. The accommodating space 168 includes the magnetic field generation unit 164 such as a magnet. A side of the magnetic field generation unit 164 facing the position sensor 162 has an N pole and an S pole. The main board 161 is between the support frame 14 and the cover plate 15. The position sensor 162 faces the magnetic field generation unit 164. The main board 161 includes a plurality of connecting holes 169. A plurality of connection members 151 passes through the connecting hole 169 of the main board 161 and is then screwed into the screw hole 108 of the movable portion 10.

For the drive unit 20, in this embodiment, the drive unit 20 is an electric motor. An output shaft 21 of the drive unit 20 is pivotally connected to a drive gear 22. The drive gear 22 drives, by using a transmission assembly 30, the main drive gear 13 to rotate. The transmission assembly 30 is a reduction gear set. The drive unit 20 further includes a control module 23 to control a number of drive cycles and a rotational speed of the drive unit 20. The control module 23 is electrically connected to the processing unit 17. The memory unit 18 stores a comparison table. The comparison table includes comparison information between the positioning information and a position of the electronic rear derailleur. The processing unit 17 accesses the comparison table after obtaining the positioning information to obtain the position of the electronic rear derailleur, and corrects the control module 23.

The transmission assembly 30 is assembled on the gear box 40 and a housing 41. The housing 41 is disposed on a side of the support frame 14 facing the cover plate 15. The gear box 40 includes a shaft tube 42 and an internal space 43 in a direction facing the movable portion 10. The internal space 43 is in communication with the shaft tube 42. The housing 41 has a first hole 411, a second hole 412, and a third hole 413. The transmission assembly 30 includes: a worm 31 disposed on the shaft tube 42 of the gear box 40 and a driven gear 32 located at one end of the worm 31. The driven gear 32 meshes with the drive gear 22, to drive the driven gear 32 to rotate and cause the worm 31 to rotate. The worm 31 is assembled with a worm gear 33 to drive the worm gear 33 to rotate. The worm gear 33 is pivotally connected to a pivot 341 of a first gear 34 to drive the first gear 34 to rotate. The first gear 34 meshes with a second gear 35 to drive the second gear 35 to rotate. The second gear 35 is coaxial with a third gear 36 to drive the third gear 36 to rotate, and the third gear 36 meshes with a fourth gear 37 to drive the fourth gear 37 to rotate. The fourth gear 37 is sleeved on a pivot of a fifth gear 38 to cause the fifth gear 38 and the fourth gear 37 to rotate together. The fourth gear 37 includes a flange 371 in a direction facing the fifth gear 38. A second bearing 39 is sleeved on an outer periphery of the flange 371. The second bearing 39 is between the third hole 413 of the housing 41 and the flange 371 of the fourth gear 37, to cause the fourth gear 37 to be disposed on the housing 41. A pivot of the fifth gear 38 passes through the support frame 14, to cause the fifth gear 38 to be meshed with the main drive gear 13 so as to drive the main drive gear 13 to rotate. A pivot of the third gear 36 passes through the second hole 412 of the housing 41. The third gear 36 is located in a ring groove 414 of the housing 41. The ring groove 414 is located on a side of the second hole 412 facing the gear box 40. The pivot of the third gear 36 passes through the second hole 412. The pivot 341 of the first gear 34 passes through the first hole 411 of the housing 41. The first gear 34 has fewer teeth than the second gear 35, the third gear 36 has fewer teeth than the fourth gear 37, and the fifth gear 38 has fewer teeth than the main drive gear 13. The worm 31 drives the worm gear 33 to rotate for deceleration transmission. Therefore, the transmission assembly 30 is a reduction gear set and is disposed in an internal space 43 of the gear box 40. The gear box 40 includes a screw hole 415. A connecting member 151 located on a right side of the cover plate 15 passes through the cover plate 15 and is then screwed into the screw hole 415 of the gear box 40.

The fixing portion 50 is cylindrical, one end of the fixing portion 50 being connected to the rear frame 100 of the bicycle. The other end of the fixing portion 50 is connected to the movable portion 10 by using a first connecting portion 51. The first connecting portion 51 includes a first accommodating recess 52 in a direction facing the movable portion 10. The first accommodating recess 52 is engaged with the first convex portion 109 of the movable portion 10. An inside of the first accommodating recess 52 includes non-circular first mating holes 53. The first mating holes 53 are in communication with the first joint hole 104 of the movable portion 10. In this embodiment, the first mating holes 53 are square holes. The first mating holes 53 include a first shaft pillar 54. The first shaft pillar 54 is engaged with a first shaft hole 114 of the first driven gear 11. A first sleeve portion 111 of the first driven gear 11 is assembled with the first mating holes 53.

The chain guide portion 60 is used to guide a chain of the bicycle, and is disposed at the second end 102 of the movable portion 10. The chain guide portion includes: a second connecting portion 61 connected to the movable portion 10 and a chain guide arm 62 connected to the second connecting portion 61. The chain guide portion 60 includes at least one pulley 63 for tensioning the chain. The second connecting portion 61 includes a second accommodating recess 64 in a direction facing the movable portion 10. The second accommodating recess 64 is engaged with a second convex portion 110 of the movable portion 10. An inside of the second accommodating recess 64 includes non-circular second mating holes 65. The second mating holes 65 are in communication with the second joint hole 105 of the movable portion 10. In this embodiment, the second mating holes 65 are square holes. A second shaft pillar 66 passes through the second mating holes 65. The second shaft pillar 66 is engaged with a second shaft hole 122 of the second driven gear 12. A second sleeve portion 121 of the second driven gear 12 is assembled with the second mating holes 65.

Through the foregoing structure, the output shaft 21 of the drive unit 20 is pivotally connected to the drive gear 22 after started. The drive gear 22 drives, by using the transmission assembly 30, the main drive gear 13 to rotate. The main drive gear 13 meshes with the first driven gear 11 and the second driven gear 12, to simultaneously drive the first driven gear 11 and the second driven gear 12 to rotate. Pivots of the first driven gear 11 and the second driven gear 12 are respectively sleeved in the first joint hole 104 and the second joint hole 105 of the movable portion 10, and the first sleeve portion 111 of the first driven gear 11 is engaged with the first mating holes 53 of the first connecting portion 51 to drive the first connecting portion 51 to rotate. The second sleeve portion 121 of the second driven gear 12 is engaged with the second mating holes 65 of the second connecting portion 61 to drive the second connecting portion 61 to rotate, so that the fixing portion 50 and the chain guide portion 60 are movably connected to the movable portion 10, further causing the chain guide portion 60 to move. A chain hung on the pulley 63 is also moved accordingly, so as to switch the chain to be meshed with a target sprocket among a plurality of sprockets, thereby achieving gear shift.

According to the disclosure, the support frame 14 includes the positioning shaft 163, the positioning shaft 163 rotating with the first driven gear 11. The accommodating space 168 of the positioning shaft 163 includes the magnetic field generation unit 164, the magnetic field generation unit 164 having the N pole and the S pole. In addition, the position sensor 162 is disposed on the main board 161 between the support frame 14 and the cover plate 15 in the direction facing the magnetic field generation unit 164, so that the position sensor 162 detects an angular position of the magnetic field generation unit 164 and transmits a detected signal back to the control module for correction. In this way, after the rear derailleur is used for a considerable period of time, the main drive gear 13, the first driven gear 11, and the second driven gear 12 are loose, resulting in transmission inaccuracy, and further causing the magnetic field generation unit 164 disposed in the accommodating space 168 on the positioning shaft 163 not to rotate at a precise angular position. In this case, the detected angular position signal of the magnetic field generation unit 164 may be transmitted, by the detection of the position sensor 162 on the main board, back to the control module 161 for correction. The position sensor 162 is configured to detect a change in the angular position to correct a parameter in the controller so as to restore normal speed change positioning, achieving normal speed change through derailleur.

The foregoing embodiments are only preferred embodiments listed for fully describing the disclosure, and the protection scope of the disclosure is not limited thereto. Equivalent replacements or changes made by those skilled in the art on the basis of the disclosure shall fall within the protection scope of the disclosure. The protection scope of the disclosure is subject to the claims.

What is claimed is:

1. An electronic rear derailleur, comprising:
   a movable portion comprising a main drive gear meshing with a first driven gear and a second driven gear;
   a support frame disposed on the movable portion and for the main drive gear, the first driven gear, and the second driven gear to perform positioning, the support frame comprising a first support hole;
   a drive unit configured to drive, by using a transmission assembly, the main drive gear to rotate;
   a fixing portion fixed to a rear frame of a bicycle and having a first connecting portion connected to the first driven gear, to cause the first connecting portion to be moveably connected to a first end of the movable portion;
   a chain guide portion having a second connecting portion connected to the second driven gear, to cause the chain guide portion to be moveably connected to a second end of the movable portion, the chain guide portion comprising at least one pulley meshing with a chain of the bicycle; and
   a positioning system comprising: a main board, a processing unit and a position sensor disposed on the main board, and a positioning shaft disposed in the first support hole of the support frame and connected to the first driven gear, the positioning shaft comprising a magnetic field generation unit facing the position sensor.

2. The electronic rear derailleur according to claim 1, wherein the first driven gear comprising a first recess in a direction facing the support frame, a center of the first driven gear comprising a first shaft hole, the positioning shaft comprising a convex portion assembled with the first recess, a convex pillar extending from the convex portion toward a direction of the first shaft hole, and the convex pillar being assembled with the first shaft hole of the first driven gear.

3. The electronic rear derailleur according to claim 1, wherein the positioning shaft comprises an accommodating space, the magnetic field generation unit being disposed in the accommodating space.

4. The electronic rear derailleur according to claim 1, wherein the positioning shaft is mounted in the first support hole of the support frame through a first bearing.

5. The electronic rear derailleur according to claim 1, wherein the drive unit comprises a control module to control a number of drive cycles and a rotational speed of the drive unit, the control module being electrically connected to the processing unit.

6. The electronic rear derailleur according to claim 5, wherein the main board further comprises a memory unit electrically connected to the processing unit, the memory unit storing a comparison table comprising comparison information between the positioning information and a position of the electronic rear derailleur.

7. The electronic rear derailleur according to claim 1, wherein the position sensor is a Hall effect sensor, and a side of the magnetic field generation unit facing the position sensor has at least an N pole and an S pole.

8. The electronic rear derailleur according to claim 2, wherein the positioning shaft is a bolt, the convex pillar has an external thread, and the first shaft hole comprises an internal thread for the convex pillar to be screwed and for the positioning shaft to rotate with the first driven gear.

9. The electronic rear derailleur according to claim 1, wherein the position sensor and the drive unit are disposed on two opposite sides of the main board, respectively.

10. The electronic rear derailleur according to claim 1, wherein the position sensor and the magnetic field generation unit are disposed with no contact.

* * * * *